United States Patent
Hallenborg

(10) Patent No.: US 10,970,370 B2
(45) Date of Patent: Apr. 6, 2021

(54) METHOD AND SYSTEM FOR CREATING A STRONG AUTHENTICATION FOR A USER USING A PORTABLE ELECTRONIC DEVICE

(71) Applicant: Identitrade AB, Stockholm (SE)

(72) Inventor: Philip Hallenborg, Djursholm (SE)

(73) Assignee: ZealiD AB, Stockholm (SE)

( * ) Notice: Subject to any disclaimer, the term of this patent is extended or adjusted under 35 U.S.C. 154(b) by 233 days.

(21) Appl. No.: 16/018,485

(22) Filed: Jun. 26, 2018

(65) Prior Publication Data

US 2019/0026446 A1   Jan. 24, 2019

(30) Foreign Application Priority Data

Jul. 21, 2017   (SE) .................................. 1750953-0

(51) Int. Cl.
| | | |
|---|---|---|
| *H04L 29/06* | (2006.01) |
| *H04L 9/32* | (2006.01) |
| *H04L 9/08* | (2006.01) |
| *G06F 21/31* | (2013.01) |
| *G06F 21/40* | (2013.01) |
| *G06F 21/36* | (2013.01) |
| *G06K 9/20* | (2006.01) |

(52) U.S. Cl.
CPC .............. *G06F 21/31* (2013.01); *G06F 21/36* (2013.01); *G06F 21/40* (2013.01); *G06K 9/2054* (2013.01); *H04L 9/0825* (2013.01); *H04L 9/3236* (2013.01); *H04L 63/0838* (2013.01); *H04L 63/0853* (2013.01); *G06K 2209/01* (2013.01)

(58) Field of Classification Search
CPC .......... G06F 21/40; G06F 21/36; G06F 21/31; H04L 9/0825; H04L 63/0853; H04L 9/3236; H04L 63/0838; G06K 9/2054; G06K 2209/01
See application file for complete search history.

(56) References Cited

U.S. PATENT DOCUMENTS

| | | | | |
|---|---|---|---|---|
| 9,294,475 | B2 * | 3/2016 | Hoyos | ..................... G07F 19/20 |
| 9,465,800 | B2 | 10/2016 | Lacey | |
| 2002/0056043 | A1 * | 5/2002 | Glass | .................. H04L 63/0861 |
| | | | | 713/179 |
| 2003/0051164 | A1 | 3/2003 | Patton | |
| 2011/0276484 | A1 | 11/2011 | Pearson et al. | |

(Continued)

FOREIGN PATENT DOCUMENTS

| | | |
|---|---|---|
| SE | 1450927-7 A1 | 2/2016 |
| SE | 1551176-9 A1 | 3/2017 |

*Primary Examiner* — Mohammad A Siddiqi
(74) *Attorney, Agent, or Firm* — Tucker Ellis LLP

(57) ABSTRACT

Technique for creating a strong authentication for a user using a portable electronic device held by the user. A central server requests an external authentication service provider, which provides a first set of user information, to authenticate the user. The user captures a still or moving image of a valid physical piece of user identification and the central server performs optical character recognition on the image, thereby obtaining a second set of user information. The central server compares the first and second sets of user information. In case the first and second sets of user information match, the portable electronic device is associated with the user and a piece of user-specific authentication information.

21 Claims, 3 Drawing Sheets

(56) References Cited

U.S. PATENT DOCUMENTS

| | | |
|---|---|---|
| 2013/0133086 A1 | 5/2013 | Liberman et al. |
| 2013/0179346 A1* | 7/2013 | Kumnick .......... G06Q 20/40145 |
| | | 705/44 |
| 2013/0204786 A1 | 8/2013 | Mattes et al. |
| 2014/0279519 A1 | 9/2014 | Mattes |
| 2015/0235215 A1* | 8/2015 | Kumar ................... G06F 21/31 |
| | | 705/44 |
| 2016/0063235 A1* | 3/2016 | Tussy ................... H04W 12/06 |
| | | 726/6 |
| 2016/0098722 A1 | 4/2016 | Irwin et al. |
| 2017/0302642 A1* | 10/2017 | Hindocha ............... H04W 4/14 |
| 2020/0092285 A1* | 3/2020 | Graham ............. G06F 21/6254 |

\* cited by examiner

METHOD AND SYSTEM FOR CREATING A STRONG AUTHENTICATION FOR A USER USING A PORTABLE ELECTRONIC DEVICE

RELATED APPLICATION DATA

This application claims the benefit of Swedish Patent Application No. 1750953-0, filed Jul. 21, 2017, the disclosure of which is incorporated herein by reference in its entirety.

The present invention relates to a method and a system for creating a strong authentication for a user using a portable electronic device. In particular, the invention relates to such a method and such a system using a central server, more particularly wherein such a central server interacts with several authentication service providers capable of authenticating the user based upon control over said portable electronic device.

There have been many proposals in the prior art on how to provide end users with secure yet uncomplicated ways of authentication. Such authentication may be of the user's person, such as during a login process, of a digital transaction, a digital document, and similar.

For instance, it has been proposed to use a portable electronic device as a something-you-have authentication factor, by tying the device in question cryptographically to a particular user.

It has been proposed, for instance in SE 1450927-7, to use a central server for connecting to several authentication service providers with the purpose of authenticating a user.

It has also been proposed, in SE 1551176-9, to use an authentication session with a mobile phone operator to authenticate a user in a secondary network, such as a WiFi network.

Furthermore, the prior art has suggested automatically interpreting information contained in pieces of physical identification, using a mobile phone. In this regard, the prior art comprises US 2014279519 A1, U.S. Pat. No. 9,465,800 B2 and US 2003051164 A1.

However, there is a need for an even stronger user authentication, which once configured may be used in any circumstance and with only a minimum of user interaction. Such an authentication should also be very easy to configure.

The present invention proposes a solution to at least this problem.

Hence, the invention relates to a method for creating a strong authentication for a user using a portable electronic device held by the user, characterised in that the method comprises the steps a) a central server requesting an external authentication service provider to authenticate the user; b) providing, from the authentication service provider to the central serve, a first set of user information; c) allowing the user, using an integrated camera of the portable electronic device, to capture a still or moving image of a valid physical piece of user identification; d) the central server receiving, from the portable electronic device, the said image, and performing optical character recognition on the image, thereby obtaining a second set of user information; e) the central server comparing the first and second sets of user information; f) in case the first and second sets of user information match, associating in the central server the portable electronic device with the user and a piece of user-specific authentication information.

Moreover, the invention relates to a system for creating a strong authentication for a user using a portable electronic device held by the user, characterised in that the system comprises a central server, arranged to request an external authentication service provider to authenticate the user, in that the central server is arranged to receive, from the authentication service provider, a first set of user information, in that the system is arranged to allow the user, using an integrated camera of the portable electronic device, to capture a still or moving image of a valid physical piece of user identification, in that the central server is arranged to receive, from the portable electronic device, the said image, and to perform optical character recognition on the image, thereby obtaining a second set of user information, in that the central server is arranged to compare the first and second sets of user information, and in that the central server is arranged to, in case the first and second sets of user information match, associate in the central server the portable electronic device with the user and a piece of user-specific authentication information.

In the following, the invention will be described in detail, with reference to exemplifying embodiments of the invention and to the enclosed drawings, wherein.

Figure 1:
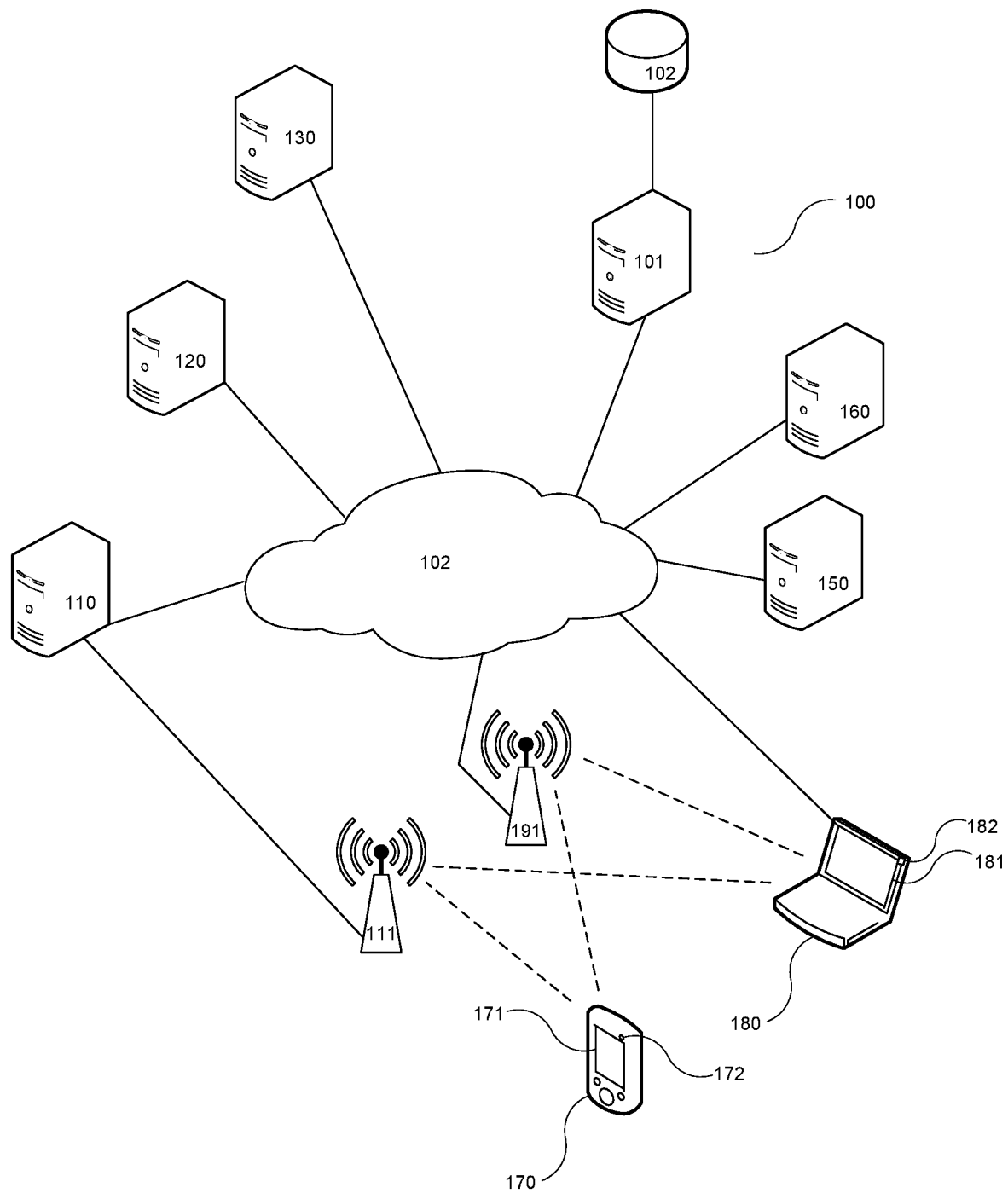
FIG. 1 is a simplified illustration of a system according to the present invention and arranged to perform a method according to the present invention.

Hence, FIG. 1 shows a system 100 according to the present invention, comprising a central server 101 in turn comprising or in communication with a database 102; at least one, preferably at least two, preferably a plurality of user service providers 150, 160; and at least one, preferably at least two, preferably a plurality of authentication service providers 110, 120, 130. In another aspect of the invention, the system 100 only comprises the central server 101, the database 102 and any software provided by the central server 101 to connected authentication service providers 110, 120, 130 and user service providers 150, 160, which are as such thus not part of the system 100, and also the software function discussed below, executing on the portable electronic device 170, 180.

The database 102 comprises information regarding registered authentication service providers 110, 120, 130, user service providers 150, 160, devices 170, 180, device 170, 180 software functions and users, such as required minimum allowed authentication levels for various conditions. The central server 101 is in general arranged to store information described herein in the database 102. This pertains, for instance, to the user-specific authentication information described below.

The user service providers 150, 160 may be any type of party capable of providing services to users remotely, such as online vendors; public service actors such as libraries, government institutions or the like; financial institutions, such as online banks; payment providers; online communities; communication services; or any other actor providing a service to users remotely in a way so that the identity of the user is needed in order to provide at least one of the services provided. It is preferred that users communicate with the service providers 150, 160 directly over a digital communications network 102 such as the internet. In the following, when the term "internet" is used, it is understood that any type of digital communications network may be used, as applicable, such as wired or wireless local area or wide area networks. Specifically, all entities 101, 110, 120, 130, 150, 160, 170, 180 are interconnected, directly or indirectly, by this network 102.

In FIG. 1, broken lines denote wireless communication while full lines denote wired communication.

The authentication service providers 110, 120, 130 may, furthermore, be any type of party capable of providing authentication services to users remotely, and in particular being arranged to perform authentication of users. Examples include online vendors; public service actors such as libraries, government institutions or the like; financial institutions, such as online banks; payment providers; online communities; communication services; or any other actor the relationship of which to each user requires that the identity of the user in question is safely established by a user authentication function provided by the authentication provider 110, 120, 130. It is preferred that the authentication providers 110, 120, 130 communicate directly with each respective user. This communication can take place over the network 102, but preferably for at least one of the authentication service providers 110, the communication between the provider 110 and a portable user electronic device 170, 180 is performed via a mobile wireless network operated by the provider 110 in question and serving the user electronic device 170, 180 with communication services, using a base station 111, which is a part of the said mobile wireless network and which is preferably operated by the provider 110. It is preferred that the said mobile wireless network is one in which a subscriber identity, such as an IMSI (International Mobile Subscriber Identity), is needed for connection to the network, such as via the use of a SIM (Subscriber Identity Module) card installed in the electronic device communicating with the network in question, or a software function corresponding to the identifying function of a SIM card. Examples of such networks comprise telephony networks such as GSM, 3G, LTE and 5G networks. Preferably, the provider 110 is the network operator of the said network, and as such has firsthand access to the identity of the electronic device 170, 180 when connected to the said mobile wireless network. The base station 111 is a part of the said mobile wireless network.

As used herein, the term "authentication service" means a remotely provided service for authenticating a user, comprising establishing with a certain minimum level of security a correct identity of the user. Such a minimum level of security, such as a minimum level of assurance (LOA), is herein denoted "authentication level". Examples of such authentication levels are those definitions of which are provided by NIST (National Institution of Standards and Technology, USA), according to which there are at least four basic levels of assurance levels, ranging from low security procedures where it is only tested whether it is the same user accessing a service at different occasions ("Level 1") up to high security procedures where authentication is dependent upon the user's possession of a strongly encrypted cryptographic key ("Level 4"). See www.nist.gov for further information. Herein, it is preferred that each authentication service provider 110, 120, 130 is unambiguously associated with one or several certain available well-defined authentication levels, the requirements of which the authentication service in question fulfills, and that each authentication service provider is associated with a certain respective minimum supported authentication level. It is possible that a particular authentication service provider is associated with different minimum authentication levels in relation to different users. It is preferred that this information is stored in the database 102 and accessible from the central server 101. The information may, for instance, be supplied in an initial registration step of each authentication service provider 110, 120, 130 with the central server 101, and may subsequently be updated, for instance in reaction to new information in relation to specific users. It is also possible that available authentication levels in relation to a specific user are provided, by request from the central server 101 to one or several authentication service providers that have been identified as being available for authenticating the user in question.

Preferably, for at least one authentication service provider 110, which is an operator of a mobile wireless network comprising the base station 111 in communication with at least one user electronic device 170, 180, an authentication factor used by that authentication service provider 110 is of the kind "something you have", whereby the item held by the user to be authenticated is the said user electronic device 170, 180 in question. This means that the authentication provided by the authentication service provider 110 is based upon the control of the user over the electronic device 170, 180 which is connected to the said mobile wireless network. By for instance receiving an SMS (Short Message Service) message on the electronic device 170, 180, which is sent from the provider 110 via the base station 111, which SMS comprises a code, and entering that code via another channel, such as via a web interface, so that the entered code reaches the authentication service provider 110, the possession of the electronic device 170, 180 can be proven, and hence the identity of the user, which has previously been securely authenticated in connection to the signing up for the subscription to the said mobile wireless network.

The portable electronic device 170, 180 may also be used as a "something you have" authentication factor in other ways. For instance, a bank or similar authentication service provider may previously have taken part in the local installation of a piece of third-party authentication software on the electronic device 170, 180 in question, which software may then be used for an authentication using the electronic device 170, 180 as a "some-thing-you-have" factor. Examples of this comprises the Swedish service "BankID", which is based upon a private cryptographic PKI key stored locally on the electronic device 170, 180 in question. In this example, such a software function is separate from the software function according to the present invention and described below, and is not provided by the central server 101 but via other, third-party channels in a way which is separate and distinct from the system 100.

It is realized that each one of entities 101, 110, 120, 130, 150, 160 may be implemented as a respective standalone, internet connected server; a distributed or virtual set of servers; or in any other configuration, as long as the respective entity in question provides a well-defined interface for communications to and from the entity.

Each user communicating with the system 100 uses an electronic device 170, 180, which is preferably arranged to communicate with the system 100 over the network 102. In FIG. 1, such devices are exemplified by a mobile phone 170 of so-called smartphone type and a portable computer 180. However, the electronic device can be any device capable of communicating with the system 100, in particular wirelessly, such as a desktop computer or a machine-to-machine interface. In this context, the term "wireless communication" means communication which is at least partly conducted over a wireless link. It is preferred that the device 170, 180 is of general-purpose type, and it is also preferred that the device 170, 180 comprises a respective display 171, 181 capable of providing an interactive graphical user interface to the user. This interactive graphical user interface is preferably provided by the below-discussed software function, and provides the channel for communicating between the user and the said software function.

Preferably, the electronic device 170, 180 comprises a SIM (Subscriber Identity Module) card, or the corresponding (such as a corresponding software function), arranged to uniquely identify the electronic device 170, 180 to a mobile wireless network, such as the one operated by the provider 110, to which the device 170, 180 is connected. Such identification may, for instance, be via an IMSI code.

Preferably, each electronic device 170, 180 is arranged to communicate via at least one wired or wireless communication path provided via said base station 111, and preferably with the network 102 via at least one other wireless channel, such as over the mobile wireless network of another operator, such as an LTE roaming partner to the operator 110; a conventional wireless internet connection which is not a mobile telephony connection, such as a WiFi connection via a WiFi access point 191, or using a conventional wired internet connection (exemplified using a full line from device 180 in FIG. 1).

The user is preferably a human being, but in some aspects the user may be a machine-implemented communication part in a machine-to-machine implemented system. In the latter case, the electronic device 170, 180 may be comprised in or constitute the machine in question.

Figure 2:
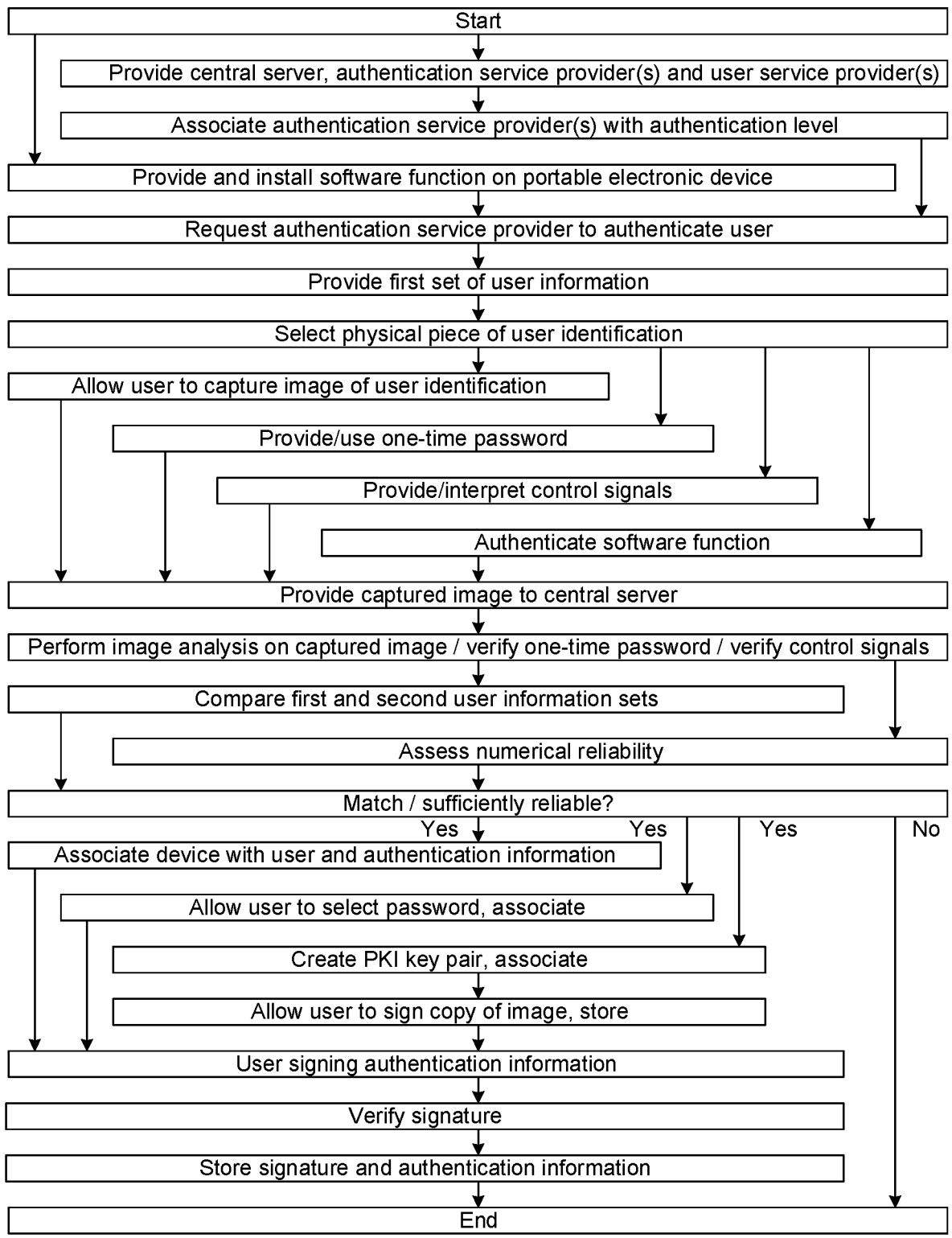
FIG. 2 is a flow chart of a method according to the present invention.

FIG. 2 shows a method according to the present invention, for creating a strong authentication for a user using a portable electronic device held by the user. In a first step, the method starts.

In a subsequent step, the central server 101 is provided, and is arranged to be in communication with at least one authentication service provider 110, 120, 130 and at least one user service provider 150, 160. It is realized that this step provision step can be performed in advance and only one time for several runs of the method.

In a subsequent step, each authentication service provider 110, 120, 130 is preferably associated with at least one respective available level of authentication. Each particular provider 110, 120, 130 may be associated with several available such levels, in which case one of the available levels for a certain provider 110, 120, 130 is considered to be the lowest, or least safe, level. For instance, adding another identification factor, such as an additional physical token owned/controlled by the user, or adding encryption, would make the authentication level safer.

As indicated above, for at least one authentication servicer provider, the respective available authentication level comprises a "something you have" authentication factor, based upon the control over the electronic device 170, 180.

In a subsequent step, the central server 101 requests one of said authentication service providers to authenticate the user. This may, for instance, mean that the user successfully logs into a web page provided by the authentication service provider in question, or that the user in any other suitable manner provides proof, at a certain authentication level, of the identity of the user in question. For instance, such authentication may comprise that the user provides some type of user credential data to the authentication service provider; that the user uses a software function on the portable electronic device 170, 180 to produce a signature using a private PKI key; or in any other suitable way.

Herein, "credential data" is to be understood as all types of user-specific information that can be provided from a user via an electronic device 170, 180 and that can be used by an authenticating party to identify or prove the identity of the user in question, such as user name—password combinations; PIN codes; cryptographic keys; hash values; biometric data, such as fingerprint data; and so on.

Preferably, in the said authentication step, at least one authentication service provider 110 authenticates the user based upon control, and hence possession, of the electronic device 170, 180, further based upon an association between the electronic device, a SIM card comprised in the electronic device, or the like, and the user, which association has previously been stored by the authentication service provider 110 in question after an initial authentication of the user as such, for instance in connection to the purchase of the subscription. Such initial authentication may for instance be a real-life authentication, in which the user provides a personal identification card to office staff of the authentication service provider. The authentication by the provider 110 may be by sending an SMS as described above, or for instance by the mobile wireless network of the provider 110 automatically reading some information from the electronic device 170, 180, such as an IMSI number provided by a SIM card in the electronic device 170, 180, or a MAC address of the electronic device 170, 180.

Preferably, the authentication based upon control of the portable electronic device 170, 180 is preferably performed automatically and without any interaction with the user. For instance, this may take place by the software function executing on the electronic device 170, 180 communicating with the central server 101 and automatically supplying required device 170, 180 and/or user specific information to the authentication service provider 110, 120, 130 in question upon request from the central server 101.

The authentication in this step may furthermore be performed in connection to the authentication service provider in question providing some type of service to the user, comprising providing an authentication service on the initiative of the central server 101.

Hence, at the time of this authentication step, the authentication service provider in question holds information regarding the user, for instance user credential data or the knowledge of an IMSI or MSISDN code of the electronic device 170, 180, allowing the authentication service provider to authenticate the user at a particular authentication level.

Alternatively, the authentication service provider already has an active authentication session with respect to the authenticated user. This may mean that the user (or the said software function, as the case may be) does not have to provide credential data, or does not have to prove control over the electronic device 170, 180, when being authenticated again within a predetermined time period during which the said session is active. The time period may be defined by the authentication service provider. In this case, the authentication step may simply involve verifying that such an active authentication session from a previous authentication, of the user with the same authentication service provider, exists.

As mentioned above, it is the central server 101 that queries the authentication service provider 110, 120, 130 to authenticate the user. Thereafter, it is preferably the authentication service provider 110, 120, 130 that verifies whether or not an already active authentication session exists, before replying to the central server 101.

The central server 101 preferably selects an authentication service provider 110, 120, 130 to use based upon a predetermined criterion concerning a least acceptable authentication level, as compared to information stored and available to the central server 101 regarding available such authentication levels, and authentication service providers available for authenticating the user in question. The least acceptable authentication level is preferably selected based upon a type of strong user authentication to be created.

In particular, authentication service providers 110, 120, 130 that are available for authenticating the user using the portable electronic device 170, 180 may have stored information signaling this to the central server 101, on the portable electronic device 170, 180 ahead of time. For instance, such information may be stored in the form of a cookie placed on the portable electronic device 170, 180 by the central server 101 in connection to an authentication of the user using an authentication user interface provided by the authentication service provider in question. By way of example, an authentication web interface provided by the authentication service provider 110, 120, 130 in question and accessed from the portable electronic device 170, 180 may be arranged to allow the central server 101 to place a cookie on the electronic device 170, 180 identifying the authentication service provider 110, 120, 130 in question. For instance, this may be accomplished by the authentication web interface comprising web content provided by the central server 101, so that the central server 101 is called as a result of the loading of the authentication service interface. The placed cookie may then be read by the central server 101 as a result of a later call from the portable electronic device 170, 180, for instance a call to a user service provider 150, 160, a user service web interface being arranged to automatically call the central server 101 (hence reading the cookie previously placed) as a result of loading the said user service web interface, in a way which is similar to the case for the authentication web interface. This way, the present process may be made seamless from the user's point of view, the central server 101 taking responsibility for the whole decision chain.

Once the user has been authenticated by the authentication service provider 110, 120, 130 as described above, a first set of user information is provided from the authentication service provider 110, 120, 130 in question to the central server 101.

This first set of user information can be any digitally stored information which is specific for the user, such as name, address, social security number, gender, place of birth, age, length, eye colour, hair colour, weight, etc., or any combination of such data. The authentication service provider 110, 120, 130 in question has previously obtained and stored the first set of user information in a safe manner, why the first set of user information can be trusted to be accurate.

The providing of the first set of user information may be accomplished by a simple reply to the above mentioned authentication request posed by the central server 101 to the selected authentication service provider 110, 120, 130 in question.

However, according to a preferred embodiment, a software function is provided by the central server 101 and is locally installed and arranged to execute locally on the portable electronic device 170, 180. Such installation is preferably performed in an initial step (see FIG. 2). Then, the software function is preferably used by the central server 101 to remotely access and communicate with the portable electronic device 170, 180. The software function is preferably securely tied to the portable electronic device 170, 180, in the sense that it can only execute from the device 170, 180 and that the central server 101 has knowledge of to which device 170, 180 a particular instance of the software function is associated. To this end, each software function instance is preferably unique (such as uniquely configured using uniquely selected installation parameters), and may comprise an identification function uniquely identifying the particular software function instance to the central server 101. In particular, it is preferred that the software function is cryptographically tied to the physical device 170, 180, for instance by a private key of a PKI ("Public Key Infrastructure") key pair being securely stored by the software function on the device 170, 180 in question while the corresponding public key of said key pair is stored on the central server 101 and associated with the physical device 170, 180 in question, for instance identified using a MAC address or similar.

The software function provided by the central server and locally installed on the portable electronic device and arranged to execute thereon is preferably not a general-purpose software function, but rather specifically adapted for performing the authentication steps described herein. Preferably, such a software function is arranged to communicate with the central server 101 via the network 102, and to provide a user interface, such as an interactive graphical user interface (GUI) to communicate with the user via the portable electronic device 170, 180 screen 171, 181, but preferably does not expose any other external communication channels.

Preferably, the software function or the central server 101 may "scrape" the first set of user information, such as from the screen of the portable electronic device 170, 180 or directly from the authentication service provider by authenticating to the authentication service provider as the user and obtaining the first set of user information therefrom. In the latter case, either previously stored user credentials may be used, or preferably the user may be requested to enter such credentials during the authentication for scraping from the authentication service provider. For instance, the user may be encouraged to enter a PIN code on the portable device 170, 180, activating a cryptographic login step in relation to the authentication service provider, which login step is automatically initiated and then finalized by the central server 101. The central server 101 performing the scraping can use a so called web driver, essentially being or mimicking a web browser used for login/authentication to the authentication service provider. An example of such scraping is PSD2 "Direct Access". Hence, herein to "scrape the information" may mean that the software function or the central server 101 is arranged to automatically either read the first set of user on-screen information of the device 170, 180 on which it executes, to interpret the read information and to use the interpreted information as the first set of user information. For instance, the above mentioned authentication web interface may be arranged to display user information pertaining to the authenticated user, and to alert the central server 101 of the on-screen presence of such user information on a particular predetermined format and layout, whereupon the central server 101 may scrape the screen 171, 181 and obtain the first set of user information this way in a secure and repeatable manner. Alternatively, to "scrape the information" may hence mean that the software function or the central server 101 performs an automatic login to the authentication service provider, using the user's credentials as received previously or during the authentication process from the user, and to request the information directly from the authentication service provider under such login.

As mentioned above, it is furthermore preferred that the authentication of the user is performed using the control of the portable electronic device 170, 180 as a "something you have" authentication factor. In particular in this case, it is preferred that the authentication service provider 110, 120, 130 is selected by the central server 101 from a number of available authentication service providers that have an existing authentication relation to the user. This information may be made available to the central server 101 using cookies, as described above, via direct communication from the authentication service providers 110, 120, 130 to the central server 101, or in any other suitable way. Then, the above described selection step preferably comprises the central server 101 or the authentication service provider 110, 120, 130 in question first checking whether or not the user already has a valid and active authentication session with the authentication service provider based on the control of the portable electronic device 170, 180, and thereafter, if such a valid authentication session exists, using the existing authentication session as the said authentication.

According to the invention, the portable electronic device 170, 180 comprises an integrated digital camera 172, 182. The digital camera 172, 182 may be any suitable digital camera which is integrated from a hardware perspective in the device 170, 180, and control over which is allowed and provided for third party software applications by an operating system running on the device 170, 180 hardware.

Figure 3:
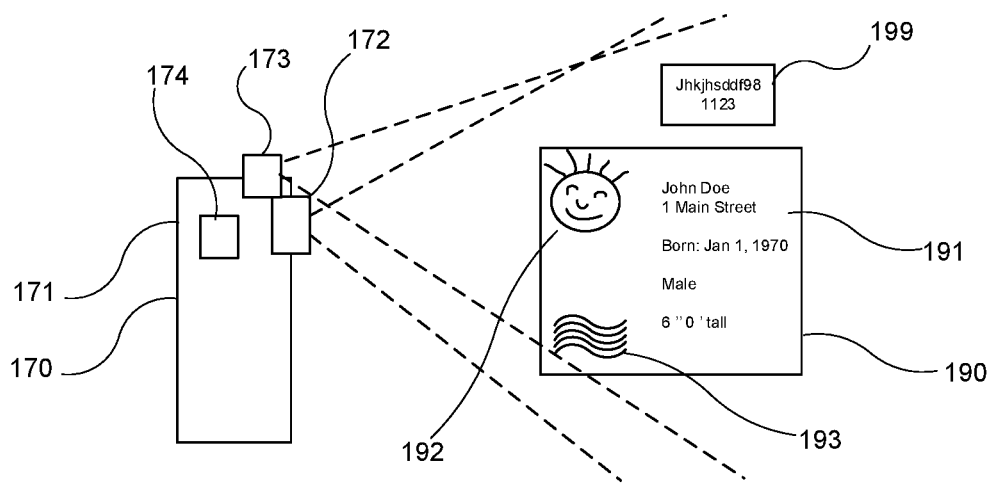
FIG. 3 illustrates a portable electronic device capturing an image of a physical piece of user identification.

In a subsequent step, the central server 101 is then arranged to allow the user, using the said integrated camera 172, 182 of the portable electronic device 170, 180, to capture a still or moving image of a valid physical piece of user identification 190 (see FIG. 3). It is preferred that the image contains the whole piece of user identification 190.

According to a preferred embodiment, this capture is performed by the said software function, as opposed to a standard camera application of the device 170, 180 in question. In this case, the software function is specifically arranged not to allow the user to select an already existing image (such as from a web resource or previously captured and stored on a memory of the device 170, 180 in question) and to use such an already existing image as the image of the piece of user identification. To the contrary, the software function preferably forces the user to use the camera 172, 182 of the portable electronic device to capture an image in direct connection to the above described authentication via the selected authentication service provider 110, 120, 130. For instance, this may be implemented by the software function being required to use for creating a strong user authentication according to the invention, for instance by the central server 101 and the software function using encrypted communication with the central server 101 and using the above described PKI pair so that the central server 101 can make sure that the software function is really the software function instance specifically provided by the central server 101 and installed on the particular device 170, 180 according to the above, and if this is not the case the central server 101 refusing to accept the captured image as described below. Routines for this are well-known as such, and will not be described in detail herein.

Then, the software function may be arranged to automatically activate the camera 172, 182 upon the user requesting a secure user authentication to be set up using the software function, and may not proceed to provide the captured image to the central server 101, as described below, before the image has been captured using the camera 172, 182.

FIG. 3 illustrates this, illustrating the camera 172 capturing an image of a physical piece of user identification 190, comprising distinct graphical fields such as user text information 191; a photo of the user 192; and a predetermined security feature 193 specific to the type of user identification 190 used.

In a subsequent step, the central server 101 receives, from the portable electronic device 170, 180 in question, the said image. The image is preferably sent by the said software function, preferably in encrypted form.

Upon receiving the image from the device 170, 180 in question, the central server 101 performs digital image analysis of the image, comprising optical character recognition, thereby obtaining a second set of user information (in the example shown in FIG. 3, the text information 191). The image analysis and the optical character recognition may be performed in a way which is conventional as such, comprising executing an algorithm identifying text fields in the image and interpreting textual information in such text fields.

The second set of user information may be similar to the first set of user information, and is digitally stored. The first and second user information may in some cases not be identical with respect to contained information types or fields, but must have a certain overlap so that at least one user information type (such as "name") is present in both the first and the second sets of user information.

The physical piece of user identification 190 may be any conventional and widely recognized piece of identification, such as a passport, a driver's license or a personal identification card. According to a preferred embodiment, a set of different types of such user identifications may be predefined from the central server's 101 point of view, in which set each such type of user identification is associated with certain a priori information regarding the informational contents of the type of identification in question. Such a priori information may, for instance, comprise the physical relative location of certain information fields, such as text fields, image information or physical security features, of pieces of identification of the type in question. Then, the central server 101 will preferably first determine or request information from the above described software function about the type currently used, and thereafter perform the said optical character recognition algorithm based upon said a priori information for the currently used type.

In a preferred embodiment, the user is first allowed, in said image capturing step, to select a specific type of physical user identification, using the software function and from a list of available such physical user identifications provided by the central server 101. Preferably such a list is produced by the central server 101 based upon at least one of the identity of the authentication service provider in question and a selected type of strong user authentication to produce. The type of strong authentication may be selected by the central server 101 or the user from a list of available such types of strong user authentications. For instance, for a strongest type of user authentication, only a valid passport can be used as the piece of user identification, while for a less strong type other types of valid pieces of user identification documents may be used. As mentioned above, the optical character recognition is thereafter performed based upon the assumption that the piece of physical user identification is of the selected type.

It is in general preferred that the central server 101, as a part or intrinsic property of the optical character recognition algorithm, also validates the type of user identification. This means that the central server 101 preferably either first identifies the type of user identification and then verifies that the piece of identification shown in the image fulfils all visual requirements of such an identification, or that the central server 101 uses a type assumption as discussed above and performs a corresponding verification using this assumption. Bra!

The optical character recognition is preferably done in its entirety completely automatic upon the reception of the captured image from the software function. The same pertains to other types of image analysis, such as for instance an analysis of a user photo 192 with respect to one or several of the following characteristics: Similarity to user according to other images available to the central server 101; assessed age from photo 192; and assessed gender from photo 192.

As mentioned above, it is preferred that the software function is cryptographically tied to the central server 101. In this case, it is preferred that the software function must be authenticated to the central server 101 in connection to the image capturing step in order for the central server 101 to accept the image to perform the said image analysis step.

To further strengthen the security of the present method, it is preferred that the central server 101 implements at least one control mechanism to verify that the image is captured in connection to the user being authenticated by the authentication service provider, as opposed to use an older image of a piece of user identification or the like.

One preferred way of achieving this is that the image capturing step further comprises providing to the user and/or to the portable electronic device 170, 180 a one-time password. Then, the above discussed image analysis and optical character recognition step comprises the user or the software function providing to the central server 101 the one-time password as a part of the captured image, and the image analysis step comprises the central server 101 detecting the one-time password and verifying its correctness. This detection of the one-time password may be performed using optical character recognition. For instance, the one-time password may be communicated to the user electronically, and be valid during a certain short time period, such as maximally 10 minutes from issuance.

In a preferred embodiment, the one-time password in question is provided electronically, such as in the form of a QR code, and the captured image is arranged by the user by placing the piece of user identification on or in connection to an electronic screen, such as a computer screen, showing the one-time password, visible by the camera 172, 182.

Alternatively, the one-time password in question may be provided in the form of an alphanumerical string, preferably digitally, and the captured image is arranged by the user by placing the piece of user identification adjacent to a handwritten note 199 of the one-time password, visible by the camera 172, 182.

In a preferred alternative, the user is not actively involved in the handling of the one-time password. Instead, the one-time password is provided in a predetermined format, preferably digital, which can be read or sampled by the software function, and the software function is in turn arranged to automatically modify the captured image so that the one-time password can be extracted by the central server 101 from the image once available to the central server 101. One example is a watermark, inserted into the image in connection to its capture and automatically read by the central server 101.

However, in order to guarantee that the image is captured in connection to the authentication by the authentication service provider, it is preferred that the captured image is a moving image, such as a short video clip of a few seconds, and that information encoding the one-time password is added to the moving image in the form of automatically produced physical environment factors by the software function via hardware components of the electronic device 170, 180 on which the software function executes.

For instance, the one-time password may be received by the software function as described above, and the software function activating the camera flash 173 of the electronic device 170 in a Morse code or corresponding during the capture of the moving image, in a way which can be interpreted as the one-time password by the central server 101 receiving and analysing the moving image comprising the piece of user identification.

In another example, the moving image comprises sound captured along with the image data, and the software function plays back a sound, using a loudspeaker 174 of the electronic device 170 during the capture of the moving image, which recorded sound is analysed by the central server 101 as a part of the image analysis discussed above.

In another example, during the capture of the moving image, the central server 101 produces control signals in real time to the user and/or the software function regarding qualitative aspects of the capturing process. For instance, the software function may receive such control signals in the form of simple movement orders and display such orders to the user on the screen 171, 181 during the capture of the moving image. Such orders may be "zoom in", "zoom out", "raise", "lower", "left", "right", "turn other side of identification document towards camera", "tilt identification document", etc., relating to the position of the capturing camera 172, 182 in relation to the piece of user identification 190. Then, the image analysis step comprises the central server 101 verifying, using conventional image analysis algorithms, that the user and/or software function actually performed the control steps as instructed by the central server 101 via said orders during the image capture. It is noted that the software function may perform such orders automatically, without the involvement of the user, for instance using its control over the electronic device 170, 180 to impart an optical zooming of ordered type during the moving image capturing.

In a subsequent step, the central server 101 compares the first and second sets of user information to each other.

In the preferred case in which the automatic digital analysis of the captured and received image by the central server 101 further comprises performing a digital image analysis, which image analysis is performed so as to detect at least one feature of a general layout of the piece of user identification 190; a picture of the user's face 192; and a predetermined graphical security feature 193 of the piece of user identification 190, the comparison step further comprises analysing a feature detected using said image analysis and comparing the feature in question to an expected value. For instance, the feature in question may be a certain visual identification layout or the existence of a particular security feature.

In a subsequent step, in case the first and second sets of user information match, the portable electronic device 170, 180 is associated in the central server 101 with both the user and a piece of user-specific authentication information. Preferably, the user-specific authentication information is calculated or determined as or based upon user-specific information received from the user authentication service provider.

In case the first and second sets of user information do not match, or if a determined information uncertainty is too high, the method ends.

As mentioned above, the first and second sets of user information may not overlap completely. It is preferred that the central server 101 implements, for each of a set of strong user authentication types, certain minimum criteria regarding what type or types of user information is or are required in order for a "match" to be found.

In particular, it is preferred that the associating step comprises allowing, such as using the software function, the user to select a password, such as a PIN code, and associating the portable electronic device 170, 180 with both the user and the password in the central server 101. This password may then be used when the user wishes to be authenticated at a later point in time, as described below. Alternatively or in addition thereto, a biometrically defined factor can be added and tied to the portable electronic device 170, 180. For instance, the user may be allowed to register a fingerprint using a hardware fingerprint sensor of the portable electronic device, which fingerprint is subsequently used instead of the PIN code, but in the corresponding way, during use of the created strong user authentication. Correspondingly, a user retina scan, a palm vein scan, a full visual face scan or similar can be used.

Further preferably, the associating step comprises the central server 101 creating a private/public key pair, preferably a PKI key pair, and storing (such as using the software function) the private key on the portable electronic device 170, 180. In this case, the above mentioned user-specific authentication information comprises or is the said private key. It is noted that this private key is not the same as the private key discussed above, used by the authentication service provider to authenticate the user.

In particular in this case, it is further preferred that the associating step comprises associating the software function or the electronic device 170, 180 with the said created public key and also with the said matched user information.

It is furthermore preferred that the software function is arranged to allow the user to sign a copy of the captured image, such as by signing a hash of the captured image, using the said created private key, and further that the signature is communicated to the central server 101 and stored therein for future reference.

For all the variants of the image analysis and comparison steps discussed above, it is preferred that the central server 101 further numerically assesses, using a predetermined assessment methodology, the reliability of the optical character recognition and any other image analysis performed. Such methodology may, for instance, be calculated based upon a measured uncertainty regarding the correct optical determination of a particular character printed on the piece of user identification. Then, the above discussed "match" is not considered existing in case a total determined reliability is below a predetermined value.

In other words, the associating step is only performed in case a total determined reliability is above the predetermined value.

Using such a method and such a system 100, a strong user authentication is created in a very simple yet secure manner. The strong user authentication is stored at least partly on the portable electronic device 170, 180, and preferably also at least partly on the central server 101. For instance, the strong user authentication may be manifested in the above said PKI key pair, with a user authentication private key stored on the portable electronic device 170, 180 and a corresponding user authentication public key stored on the central server 101 or elsewhere. In order to use the strong user authentication, it is preferred that the user is required to use the mentioned password.

Since the user is authenticated by the authentication service provider 110, 120, 130 in connection to the capture of the image of the piece of identity 190, a very strong authentication is achieved. Since both the authentication and the capture of the image are performed using the same portable electronic device 170, 180, the achieved user authentication is strongly tied to the portable electronic device 170, 180 as such, which therefore becomes a very strong "something you have" authentication factor. In case a password is selected, a "something you have" factor is also present.

It is hence an important aspect of the present invention that the user is authenticated (has an active, non-expired authentication session) during the whole process of capturing the image showing the physical piece of identification 190. This is achieved by the central server 101 managing the whole process, partly via the said software function on the portable electronic device 170, 180. Since the central server 101 keeps track both of the user authentication and the capture/analysis of the image, it can guarantee that the user was in fact authenticated when the piece of identification was read and validated.

Therefore, it is further preferred that the central server 101 is active in a subsequent user authentication step performed using the strong user authentication created as described above.

Hence, in a subsequent step, performed at a later point in time than the above described creation of the strong user authentication, the user is authenticated in relation to an external user service provider 150, 160. It is realized that the strong user authentication may be created in connection to the user, using the portable electronic device 170, 180, visiting a user service provider 150, 160 web interface, by such strong user authentication creation being offered to the user as an alternative. For instance, the user service provider 150, 160 may then link to the central server 101, thereby activating the above described process. Or the user service provider 150, 160 may even be a user authentication service provider, being actively involved in the creation of the strong user authentication. However, the created strong user authentication, once created, may be used to authenticate the user at said later point in time in relation to any user service provider 150, 160.

In general, such later user authentication comprises the user signing a certain authentication piece of information, using a private key stored on the portable electronic device 170, 180, such as the above mentioned private PKI key manifesting the strong user authentication on the portable electronic device 170, 180, the public key of which is held by the central server. Thereafter, the resulting signature is verified, using the said public key. Hence, any party can verify the signature, since the verification is performed based upon the private key. However, it is the central server 101 which guarantees the strong user authentication, and the central server 101 preferably exposes an API (Application Programming Interface) or other digital and preferably automatic interface that third parties can use to allow the central server 101 to verify said signature.

If the user service provider 150, 160 does not verify the signature itself, the verification is preferably communicated or indicated to the user service provider 150, 160, preferably from the central server 101. Thereafter, a user service can be safely provided to the user by the user service provider 150, 160 in question, such as a login, a money transfer, a purchase and so on.

The signature of the authentication information is performed by the portable electronic device 170, 180, preferably by the said software function, preferably without the direct involvement of the user apart from the fact that the user preferably can initiate the authentication and/or accepting that such an authentication is to be performed in relation to a user service provider 150, 160.

The piece of authentication information may in principle be any information the contents of which is known both to the portable electronic device 170, 180 and the party performing the verification. However, it is preferred that the signed piece of authentication information is a hash of an electronic, digital document to be signed by the user. In this case, the said document to be signed is preferably provided to the central server 101, whereupon the central server 101 calculates said hash and provides it to the above discussed software function executing on the portable electronic device 170, 180. Thereafter, the said software function signs the hash using the mentioned private key, and a resulting signature is provided to the central server 101. Finally, the central server 101 stores both the document and the said signature.

Above, preferred embodiments have been described. However, it is apparent to the skilled person that many modifications can be made to the disclosed embodiments without departing from the basic idea of the invention.

The present invention is applicable in a wide range of electronic, digital situations where the identity of a user must be authenticated. In particular, once created the strong user authentication may be used as a user authentication sub component in more complex processes, even for real time or near real time applications, wherein the user needs to be authenticated on-the-fly or even continuously in connection to user actions being performed.

In general, all that has been said above about the method is equally applicable to the system, and vice versa. All method steps are preferably performed automatically, digitally and electronically by corresponding system components.

Hence, the invention is not limited to the described embodiments, but can be varied within the scope of the enclosed claims.

The invention claimed is:

1. A method for creating a strong authentication factor for a user using a portable electronic device held by the user, wherein the method comprises the steps of:
   a) by a central server system, requesting an external authentication service provider system that is not part of the central server system to authenticate the user using an authentication methodology hosted by the external authentication service provider system and reliant on the portable electronic device;
   b) receiving, by the central server system and from the external authentication service provider system, a first set of information specific to the user, the first set of information specific to the user obtained and stored by the external authentication service provider system before step a) and comprising at least one of name, address, social security number, gender, place of birth, age, length, eye color, hair color, or weight;
   c) by the central server system, receiving from the portable electronic device, a still or moving image of a valid physical piece of user identification that is captured by an integrated camera of the portable electronic device and transmitted to the central server system under the control of a software function installed on the portable electronic device, the software function forcing the user to use the integrated camera to perform the capture of the image and does not allow the user to transmit an already existing image to the central server system;
   d) by the central server system, performing optical character recognition on the received image to obtain a second set of information specific to the user and derived from the valid physical piece of user identification;
   e) by the central server system, comparing the first and second sets of information specific to the user; and
   f) by the central server system, determining that the first and second sets of information specific to the user match, and, in response, creating the strong authentication factor, the strong authentication factor comprising an association of the portable electronic device and a piece of user-specific authentication information, and storing the strong authentication factor for a future transaction authentication requested by a user service provider.

2. The method according to claim 1, wherein step f) comprises associating the portable electronic device with both the user and a user-selected password in the central server system.

3. The method according to claim 1, wherein, in step a), the authentication of the user is performed using physical control of the portable electronic device as an authentication factor.

4. The method according to claim 3, wherein the authentication service provider is selected from a number of available authentication service providers that have an existing authentication relation to the user, and wherein step a) comprises the central server system or the authentication service provider first checking whether or not the user already has a valid authentication session with the authentication service provider system based on the physical control of the portable electronic device, and thereafter, if such a valid authentication session exists, using the existing authentication session as the authentication in step a).

5. The method according to claim 1, wherein, in step c), the user selects a specific type of physical user identification, from a list of available such physical user identifications provided by the central server system, which list is produced by the central server system based upon at least one of the identity of the authentication service provider system and a type of the strong user authentication, and wherein, in step d), the optical character recognition is performed based upon the piece of physical user identification being of the selected type.

6. The method according to claim 1, wherein step d) further comprises performing a digital image analysis in addition to said optical character recognition, which image analysis is performed so as to detect at least one feature of a general layout of the piece of user identification; a picture of the user's face; and a predetermined graphical security feature of the piece of user identification, and wherein the comparison in step e) further comprises analysing a feature detected using said image analysis and comparing the feature in question to an expected value.

7. The method according to claim 6, wherein the software function is provided by the central server system.

8. The method according to claim 1, wherein the software function is cryptographically tied to the central server system and the software function must be authenticated to the central server in connection to step c) in order for the central server to accept the image.

9. The method according to claim 8, wherein step f) comprises the central server system creating a private/public key pair and storing the private key on the portable electronic device, the private key being the user-specific authentication information.

10. The method according to claim 9, wherein step f) comprises associating the software function or the portable electronic device with the created public key and also with the user information.

11. The method according to claim 9, wherein step f) further comprises the user signing a copy of the image captured in step c) using the created private key, and further that the signature is communicated to the central server system.

12. The method according to claim 1, wherein step c) further comprises providing to the user and/or to the portable electronic device a one-time password, wherein step c) comprises the user or the software function providing the one-time password as a part or property of the image, and wherein step d) comprises the central server detecting the one-time password using optical character recognition and verifying its correctness.

13. The method according to claim 12, wherein the one-time password is provided electronically and wherein the image is arranged by the user by placing the piece of user identification on or in connection with an item showing the one-time password.

14. The method according to claim 12, wherein the one-time password is provided in the form of an alphanumerical string, and wherein the image is arranged by the user by placing the piece of user identification adjacent to a handwritten note of the one-time password.

15. The method according to claim 12, wherein the one-time password is provided in a format which can be read or sampled by the software function and wherein the software function is arranged to automatically modify the image so that the one-time password can be extracted from the image.

16. The method according to claim 1, wherein, in step c), the image is a moving image and, wherein the central server system, during the capture of the image, produces control signals to the user and/or the software function regarding qualitative aspects of the capturing process, and wherein step d) comprises the central server system verifying that the user and/or software function actually performed control steps corresponding to the control signals.

17. The method according to claim 1, wherein step e) further comprises the central server system numerically assessing a reliability of the optical character recognition and wherein step f) is only performed in case a total determined reliability is above a predetermined value.

18. The method according to claim 1, wherein the providing in step b) comprises the central server system scraping the first set of user information.

19. The method according to claim 1, wherein, in a subsequent step, the user is authenticated in relation to an external user service provider, which subsequent step comprises the substeps:
  g1) the user signing a piece of information using a private key of a PKI key pair, provided in step f and the public key of which is held by the central server; and
  g2) verifying, using the public key, a resulting signature.

20. The method according to claim 19, wherein the piece of information signed in step g1) is a hash of a document to be signed by the user, and wherein the method further comprises the steps of providing, to the central server, the document; the central server calculating said hash and providing it to the software function of the portable electronic device; the software function signing the hash using the said private key and providing a resulting signature to the central server; and the central server storing both the document and the said signature.

21. A system for creating a strong authentication factor for a user using a portable electronic device held by the user, wherein the system comprises a central server configured to:
  a) request an external authentication service provider system that is not part of the central server system to authenticate the user using an authentication methodology hosted by the external authentication service provider system and reliant on the portable electronic device;
  b) receive, from the external authentication service provider system, a first set of information specific to the user, the first set of information specific to the user obtained and stored by the external authentication service provider system before step a) and comprising at least one of name, address, social security number, gender, place of birth, age, length, eye color, hair color, or weight;
  c) receive, from the portable electronic device, a still or moving image of a valid physical piece of user identification that is captured by an integrated camera of the portable electronic device and transmitted to the central server system under the control of a software function installed on the portable electronic device, the software function forcing the user to use the integrated camera to perform the capture of the image and does not allow the user to transmit an already existing image to the central server system;
  d) perform optical character recognition on the received image to obtain a second set of information specific to the user and derived from the valid physical piece of user identification;
  e) compare the first and second sets of information specific to the user; and
  f) determine that the first and second sets of information specific to the user match, and, in response, create the strong authentication factor, the strong authentication factor comprising an association of the portable electronic device and a piece of user-specific authentication information, and store the strong authentication factor for a future transaction authentication requested by a user service provider.

* * * * *